3,157,672
α,ω-BIS(3-ALKYLIDENE-5,5-DIALKYL-1-PYR-
ROLINYL-2) ALKANES AND ETHERS
Albert I. Meyers, New Orleans, La., assignor to Board of
Supervisors of Louisiana State University and Agricultural and Mechanical College, Baton Rouge, La.
No Drawing. Filed Jan. 17, 1962, Ser. No. 166,935
7 Claims. (Cl. 260—326.5)

This invention relates to novel heterocyclic nitrogen compounds.

More particularly, this invention relates to novel bis-(N-heterocyclic) compounds useful as central nervous system stimulants or depressants and ganglionic blocking agents.

The numbering of the substituents used in this specification is shown by the following formula:

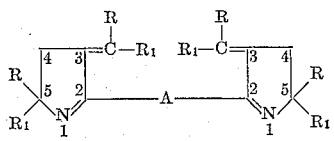

α,ω-Bis(N-heterocyclic) compounds of this invention are α,ω-bis(3-alkylidene-5,5-dialkyl-pyrrolinyl-2) alkanes and ethers of the formula:

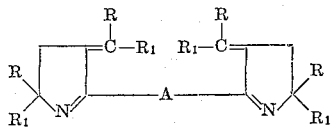

wherein R and $R_1$ are each methyl or ethyl groups and may be the same or different, and A is —$(CH_2)_2O(CH_2)_2$— or —$(CH_2)_n$— in which $n$ is an integer from 2 to 10, preferably 2, 3 or 4.

Particularly preferred are the compounds having the formula:

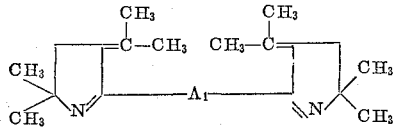

wherein $A_1$ is —$(CH_2)_2O(CH_2)_2$— or —$(CH_2)_{n1}$— and $n_1$ is 2, 3 or 4.

The compounds of the invention are prepared by reacting a glycol, viz., a 1,1,4,4-tetraalkyl-1,4-butanediol, of the formula:

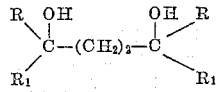

with a dinitrile, of the formula NC—A—CN, R, $R_1$, and A having the values indicated above, in the proportions of at least 2 mols of the glycol, preferably 2 to 3 mols of the glycol, per mol of the dinitrile in an acid catalyst-solvent medium. The reaction is carried out at a temperature not greater than about 15° C., preferably 0° to 15° C. The use of higher temperatures results in increased formation of undesired resin by-product. Optimum reaction time is from 2 to 4 hours at 0° to 15° C. Employing the preferred conditions and separating the heterocyclic base after neutralizing the reaction mixture, the α,ω-bis(N-heterocyclic) compounds of the invention are produced in good yields and of good purity.

Glycols useful for preparing the compounds of this invention include 2,5-dimethyl-2,5-hexanediol, 3,6-dimethyl-3,6-octanediol and 3,6-diethyl-3,6-octanediol. The dinitriles reacted with such glycols include succinonitrile, glutaronitrile, adiponitrile, 1,5-dicyano pentane, 1,10-dicyano decane, and 2,2'-dicyano ethyl ether. The aforesaid glycol and dinitrile reactants are commercially available materials, marketed by the Air Reduction Chemical Co. and Eastman Kodak Company, respectively. Reacting the glycol and dinitrile in the proportion of at least about 2, preferably from about 2 to 3, mols of the glycol per mol of the dinitrile in the presence of an acid catalyst and solvent medium for the reactants at temperatures not appreciably in excess of 15° C., I have found results in the formation of the bis(N-heterocyclic) compounds of this invention. Evidently ring formation takes place with each of the nitrogen atoms of the dinitriles and one mol of the 1,1,4,4-tetraalkyl-1,4-butanediol to produce the α,ω-bis(3-alkylidene-5,5-dialkyl-1-pyrrolinyl-2) alkanes and ethers.

Suitable acid solvent media for the reaction are concentrated sulfuric acid, concentrated hydrochloric acid, solutions of aluminum chloride in nitrobenzene, boron trifluoride in ethyl ether, boron trifluoride in nitrobenzene and boron trifluoride in trichloroacetic acid. The preferred acid solvent medium is sulfuric acid of at least 92% by weight concentration, desirably from 92% to 98% by weight concentration.

The glycol and dinitrile reactants are admixed in the acid catalyst-solvent medium in the proportion of about 1 mol of the dinitrile and 2 to 3 mols of the glycol per 20 mols of solvent. From 4 to 5 mols of the aluminum chloride in nitrobenzene, or boron trifluoride in nitrobenzene or trichloroacetic acid are preferably employed per mol of the dinitrile.

Upon completion of the reaction, polymeric byproducts are extracted with a suitable solvent such as chloroform. The residual reaction mixture is neutralized with an alkali metal hydroxide, e.g., sodium hydroxide, to produce the heterocyclic base which is separated and recovered from the neutralized solution, as by filtration and recrystallization if a solid, or by ether extraction and distillation if a liquid.

The following examples are given to exemplify the synthesis of preferred α,ω-bis(N-heterocyclic) compounds within the scope of this invention. It will be understood the invention is not limited to these examples.

*Example 1*

To a cold solution of 0.05 mol of succinonitrile in 50 ml. of 96% sulfuric acid was added in portions, 0.10 mol of solid 2,5-dimethyl-2,5-hexanediol, while maintaining the temperature of the solution between 5° and 12° C. The portion addition in this and all other examples were carried out to maintain the temperature of the reaction mixture at the values indicated, i.e., the dinitrile was added from time to time while observing the temperature, the rate of addition being such as to avoid the temperature rising above the higher temperature indicated, namely, 12° C. in this example. After all of the hexanediol had been added, the resulting solution was stirred for 2 hours, the temperature being maintained below 15° C., and then poured over 200 grams of chipped ice. The aqueous acid solution was treated with 75 ml. portions of chloroform to extract polymeric side products, and was thereafter neutralized with 30% sodium hydroxide solution. The resulting product precipitated out and was collected on a suction filter, washed and then recrystallized from ethyl acetate. There was thus obtained, in 72% yield, α,ω-bis(3-isopropylidene-5,5-dimethyl-1-pyrrolinyl-2)ethane, melting at 151–152° C., and having the formula:

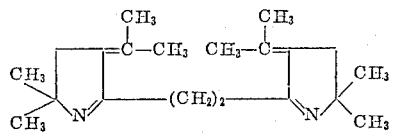

Analysis of this product showed a carbon content of 79.89% and a hydrogen content of 10.81% which compares favorably with the calculated values based on the formula of this compound of 80.00% and 10.66%, respectively.

*Example II*

To a cold solution of 0.10 mol of glutaronitrile in 75 ml. of 92% sulfuric acid was added in portions 0.20 mol of 2,5-dimethyl-2,5-hexanediol, the temperature being maintained at between 5° and 8° C. After all of the hexanediol had been added, the solution was stirred for 3 hours, the temperature being maintained below 15° C.; then the reaction mixture was poured over 250 grams of chipped ice. The aqueous solution was extracted with chloroform and then neutralized with caustic soda. An oil layer rose to the top of the reaction mixture, which layer was separated and extracted with ethyl ether. The ether solution was dried with potassium carbonate, filtered, and the ether removed on a steam bath. The residual oil was distilled under vacuum; a clear, colorless oil, boiling at 148–150° C. under 1.3 mm. Hg was thus obtained. This oil product, obtained in 76% yield, was $\alpha,\omega$ - bis(3 - isopropylidene - 5,5 - dimethyl-1-pyrrolinyl-2-propane, having the formula:

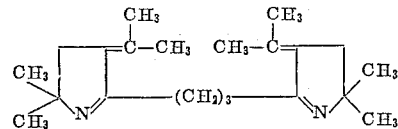

Analysis of this product showed a carbon content of 79.74% and a hydrogen content of 10.62%, which compares favorably with the calculated values, based on the formula of this compound, of 80.25% and 10.82%, respectively.

*Example III*

To a cold solution of 0.20 mol of adiponitrile in 100 ml. of 96% sulfuric acid was added in portions 0.40 mol of 2,5 - dimethyl-2,5-hexanediol, while maintaining the temperature between 8° and 11° C. After all of the hexanediol had been added, the solution was stirred for 3 hours while maintaining the temperature between 3° and 7° C., and then poured over 300 grams of chipped ice. The aqueous solution was extracted with chloroform and then neutralized with sodium hydroxide. The precipitate thus produced was collected on a suction filter, washed and then recrystallized from ethyl acetate. There was thus obtained, in 74% yield, $\alpha,\omega$-bis(3-isopropylidene-5,5 - dimethyl-1-pyrrolinyl-2)butane, having a melting point of 107–108° C., and having the formula:

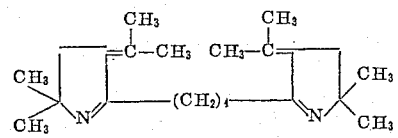

Analysis of this product showed a carbon content of 80.20% and a hydrogen content of 10.84% which compares favorably with the formula calculated values of 80.48% and 10.97%, respectively.

*Example IV*

To 0.05 mol of 1,5-dicyano pentane in 50 ml. cold concentrated (92%) sulfuric acid was added in portions 0.10 mol of 2,5-dimethyl-2,5-hexanediol, while maintaining the temperature of the reaction mixture between 10° and 12° C. The solution was stirred for 2 hours while maintaining the temperature below 15° C. and then poured over 250 grams of chipped ice. Extraction with chloroform and subsequent neutralization with sodium hydroxide produced a precipitate which was recovered by filtration and purified by recrystallization from ethyl acetate; the product was $\alpha,\omega$ - bis(3-isopropylidene - 5,5 - dimethyl-1-pyrrolinyl-2)pentane, having the formula:

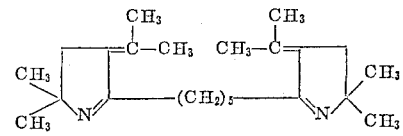

*Example V*

To 0.05 mol of 1,10-dicyano decane in 55 ml. cold concentrated (92%) sulfuric acid was added 0.1 mol 3,6-diethyl-3,6-octanediol in portions, while maintaining the temperature between 8° and 12° C. After addition of the octanediol, the solution was stirred for 2 hours while maintaining its temperature below 15° C., and then poured over 300 grams of chipped ice. Extraction with chloroform and subsequent neutralization with sodium hydroxide produced a precipitate which was collected by filtration and purified by recrystallization from ethyl acetate; the product was $\alpha,\omega$-bis[3-(3′-amylidene)-5,5-diethyl-1-pyrrolinyl-2]decane, having the formula:

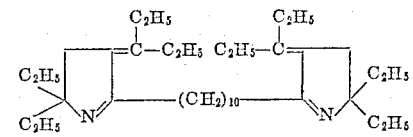

*Example VI*

To 0.10 mol of 2,2′-dicyano ethyl ether in 100 ml. cold (98%) sulfuric acid was added in portions 0.20 mol of 2,5-dimethyl-2,5-hexanediol, while maintaining the temperature of the solution between 5° and 10° C. After addition of the hexanediol, the solution was stirred for 2 hours while maintaining its temperature below 15° C., and then poured over 300 grams of chipped ice. Extraction with chloroform, followed by neutralization with sodium hydroxide, produced a precipitate which was collected by filtration and purified by recrystallization from ethyl acetate; the product was 2,2′-bis(3-isopropylidene-5,5-dimethyl-1-pyrrolinyl-2)ethyl ether, having the formula:

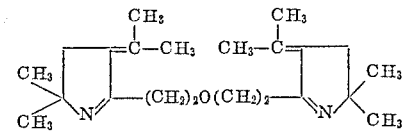

Analysis of this product showed a carbon content of 76.75%, a hydrogen content of 10.37% and a nitrogen content of 8.05%, which compare favorably with the formula calculated values of 76.74%, 10.46% and 8.14%, respectively.

The bis(N-heterocyclic) compounds of the above examples are insoluble in water and alkaline solutions; are soluble in carbon tetrachloride, ethyl ether, benzene, ethanol, chloroform, and in acids such as sulfuric, hydrochloric and other acids; and form yellow crystalline complexes (picrate salts) with picric acid. The double bonds are readily saturated by hydrogenation under 40–60 p.s.i.g. in the presence of an acetic acid solvent using a platinum or palladium catalyst.

The compounds described herein are useful as agents affecting the central nervous system since tertiary amines and specifically bis-tertiary amines are known to inhibit cholinesterase (stimulant action) and monamine oxidase. These compounds also possess nicotinic-type activity, i.e., affect the autonomic nervous system via ganglionic blocking action.

These compounds are administered through the usual parenteral routes, orally or locally. The mode of addition may be through aqueous solutions of its hydrochloride salts ($10^{-1}$ to $10^{-7}$ molar), or equivalent solutions in ethanol, or mixtures of ethanol and water containing the free base in the concentrations shown. Oral administration of the base in tablet, capsule, pill or other form is an appropriate dosage, e.g., 100 to 300 mg. produces stimulant action in the central nervous system.

It is intended that all matter contained in the above description shall be interpreted as illustrative and not in a limiting sense.

What is claimed is:

1. A compound of the formula:

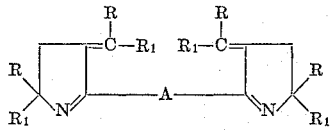

wherein R and $R_1$ are each selected from the group consisting of methyl and ethyl, A is selected from the group consisting of —$(CH_2)_2O(CH_2)_2$— and —$(CH_2)_n$—, and n is an integer from 2 to 10.

2. α,ω - Bis(3-isopropylidene-5,5-dimethyl-1-pyrrolinyl-2)ethane.

3. α,ω - Bis(isopropylidene - 5,5-dimethyl-1-pyrrolinyl-2)propane.

4. α,ω - Bis(3-isopropylidene-5,5-dimethyl-1-pyrrolinyl-2)butane.

5. α,ω - Bis(3-isopropylidene-5,5-dimethyl-1-pyrrolinyl-2)pentane.

6. α,ω - Bis[3 - (3'-amylidene)-5,5-diethyl-1-pyrrolinyl-2]decane.

7. 2,2' - bis(3-isopropylidene-5,5-dimethyl-1-pyrrolinyl-2)ethyl ether.

References Cited in the file of this patent

Meyers et al.: J. Org. Chem., volume 23, pages 1918–1924 (1958).

Meyers: J. Organic Chem., vol. 25, pages 2231–2233, December (1960).